United States Patent
Himmer et al.

(10) Patent No.: US 7,445,746 B2
(45) Date of Patent: Nov. 4, 2008

(54) TEMPERABLE MEMBER

(75) Inventors: Thomas Himmer, Dresden (DE); Anja Techel, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 434 days.

(21) Appl. No.: 11/007,575

(22) Filed: Dec. 9, 2004

(65) Prior Publication Data

US 2005/0179173 A1 Aug. 18, 2005

(30) Foreign Application Priority Data

Dec. 12, 2003 (DE) .................... 103 60 110

(51) Int. Cl.
*C21D 1/00* (2006.01)
*B22D 27/04* (2006.01)
*B29C 33/04* (2006.01)

(52) U.S. Cl. .................. 266/134; 164/348; 249/79; 425/547

(58) Field of Classification Search .......... 266/249, 266/111, 134; 164/312, 113, 319, 348; 249/79, 249/81; 425/547, 552

See application file for complete search history.

(56) References Cited

FOREIGN PATENT DOCUMENTS

| DE | 4408707 A1 | | 9/1995 |
|---|---|---|---|
| DE | 69603388 T2 | | 4/2000 |
| DE | 101 51 078 A1 | * | 12/2002 |
| DE | 10151078 A1 | | 12/2002 |
| JP | 60-4012 A | * | 1/1985 |
| JP | 5-77244 A | * | 3/1993 |
| JP | 05077244 A | | 3/1993 |

\* cited by examiner

*Primary Examiner*—Kevin P Kerns
(74) *Attorney, Agent, or Firm*—Jacobson Holman PLLC

(57) ABSTRACT

A temperable member manufacturable in a low cost and flexible manner to make possible a locally discriminating tempering process. The temperable member is formed from at least two modules joined to each other. At least one of the modules is formed as a one-piece element, and at least another element is a tempering module. The tempering module is formed from plate-shaped elements arranged on top of each other and forming a stepped outer marginal contour. The one-piece element includes a housing which is complementary to the contour. At least one channel is formed inside the tempering module.

11 Claims, 3 Drawing Sheets

TEMPERABLE MEMBER

BACKGROUND OF THE INVENTION (1) Field of the Invention

This application claims priority from German application number DE 103 60 110.4 filed on Dec. 12, 2003, which is hereby incorporated by reference.

The invention relates to members capable of being temperature controlled such as they can be used with most various applications. Thus, tempering can be carried out in the form of cooling such members. However, it is also possible for the correspondingly designed members to be heated, and allowed to perform pre-heating up to a defined temperature, respectively.

The temperable members according to the invention can be used preferably as tools for different molding processes to manufacture workpieces. So, the members according to the invention are allowed to be core molds, injection molding or die casting tools, foaming tools, blow molds, dies, but also forming tools. With such tools it is then allowed for the workpieces to be manufactured into shape or machined from the most various materials such as plastics, metals or sand cores.

(2) Description of Related Art.

With the various molding processes, different temperatures on the corresponding tools are to be taken into account. In this connection, the respective molding process and the adequate material to be used for manufacturing workpieces do not only play a part, however, quite often the geometric design of the workpieces and accordingly of the tools as well is also to be taken into account, which frequently results in considerable temperature gradients on such tools.

Thus, with such tools it happens quite often that in specific areas, there are volumes of material being distinctly greater than in other volume areas of such tools due to the geometrical design required there, and under the present temperatures and forces during the respective molding process. These volumes of material have an adequate heat capacity, and with such necessary tempering the corresponding alteration of the material temperature in such areas can be achieved in the most part by means of heat conduction only. As everybody knows, however the heat conduction increases because of greater temperature differences.

For tempering of corresponding members and tools, respectively, it is common to guide a tempering fluid, such as an adequately temperature controlled liquid, however, in some cases equivalently temperature controlled gases as well, via channels or else a channel system such that cooling or warming can be achieved with that equivalently temperature controlled fluid.

Such channels or channel systems should largely take into account the respective geometry of members and the temperatures which discriminately occur therefore locally. So, the respective volumetric flow rates of the used tempering fluid should be selectively guided into areas of such members or tools wherein increased heat quantity has to be discharged or supplied.

However, the design of such channels or channel systems is very expensive with the fabrication methods being standard for this. Thus, with the fabrication through casting methods such channels/channel systems cannot be formed in any shape and design by means of correspondingly inserted cores. Moreover, minimum wall thicknesses must be kept in order to ensure the required strength.

Because the channels/channel systems are arranged and designed usually inside such members/tools, they can only be manufactured by machining to some extent. So, such members are allowed then to be manufactured by adequately machined component parts which have to be subsequently mounted. At the same time, the joints and joint areas between the parts correspondingly joined together quite often represent a problem since they can also be arranged in critical areas and have to, respectively.

This disadvantage also occurs in particular with members/tools which are assembled of plate-like elements being arranged on top of each other and joined together, quite often also so-called laminates. In this manner, members being designed in the most different way can be manufactured by providing relatively thin-walled plate-like elements with respective apertures wherein such apertures are arranged in adjacent plate-like elements such that adequate channels may be formed by a member/tool manufactured in this way. In this manner, most different geometric shapes and dimensional designs of channels/channel systems can be obtained within members/tools manufactured in this way.

A respective assembly for an injection mold is described in DE 101 51 078 A1.

In this case too, such plate-like elements, indicated therein as lamellas or discs have been arranged on top of each other and joined together. In the plate-like elements, respective apertures which form a cooling channel and a molding cavity as well are designed.

Certainly, the inner contour of the channels due to the plate-like elements is advantageous for required cooling the injection mold as a result of occurring turbulences in the cooling medium, however, the joints between the single plate-like elements have a negative effect with respect to the quality of finish of the workpieces manufactured with it.

This disadvantage can be accepted, if necessary, for particular workpieces which are to be manufactured by plastic injection molding. However, this cannot be tolerated with high-quality workpieces. However, with forming tools, these areas are particularly critical. Thus, during the deformation of the materials for the workpieces to be manufactured, material abrasion and accordingly chip formation can occur.

However, such joint areas are critical not only in the indicated cases but they also have an adverse effect if the respective surface is to be provided with a coating. This is capable to break or even to flake off completely due to the dynamic loads or temperature variations.

With the conventional solutions, tempering elements or tempering systems designed in a complex manner can be used in combination with members/tools, if any, only in an inadequately combined manner.

In most cases, the heat supply and removal, respectively, is too low and afflicted with an increased time constant. So, in particular problems occur with the employments of members/tools within very low or very high temperature ranges or during frequent temperature variations.

SUMMARY OF THE INVENTION

It is an object of the invention to provide members which are made in a low-cost and flexible manner, wherein a locally discriminating tempering should be attainable simultaneously.

The temperable member according to the invention is formed from at least two modules connected to each other.

Then, one of the modules is designed as a one-piece element, and at least another tempering module is formed from plate-like elements arranged on top of each another. Inside this tempering module, there is designed at least one channel or channel system which the tempering fluid is allowed to flow through. As a result, the channel and channel system, respectively, is designed and dimensioned such that locally discriminating tempering can be achieved on the member according to the invention. This relates, on the one hand, to the respective environmental and process conditions, respectively, and, on the other hand, to the temperatures which really occur locally on the member. Thus, the heat supply or removal should be increased in certain areas of the respective member.

On the occasion, apertures are arranged inside the plate-like elements of a tempering module. The arrangement of these apertures is then selected such that they communicate with each other, and accordingly a tempering fluid is allowed to flow through the apertures which form a channel/channel system within the plate-like elements arranged on top of one another.

So, for example, critical areas of a forming tool, in which higher forces occur during recasting workpieces or half-finished products, are allowed to be cooled stronger than relatively uncritical marginal areas of such workpieces in which a distinctly lower portion is converted into heat.

The mentioned at least two modules of such a member according to the invention should be joined together then in a fluid-tight manner. This can be achieved by means of most different material fit joining techniques per se known such as welding, soldering and gluing wherein the operating temperatures which are mentioned can be taken into account of course. However, tempering modules are also allowed to be cast into a module designed as a one-piece element such that it is enclosed from the material of such a module at least for a large part.

However, the modules forming the member can also be mechanically joined together. This can be achieved by means of the screw joint and respective seals, for example.

However, in many cases, a releasable connection of the modules has its effect as well. So, for example, a module designed as a solidly built, one-piece element can be substituted caused by wear for a new one, and a tempering module can be used over a substantially greater time interval.

For the tempering process the most different suitable tempering fluids in the form of gases or liquids can be used, wherein liquids should be allowed to be preferred due to the higher heat capacities. Thus, water or oil as well can be used as a tempering fluid. The water or oil is then allowed to flow through the channel and channel system, respectively, and to be circulated through an inlet and outlet, via a heat exchanger, for example, into the tempering module and out of it, respectively. As a result, the respective volumetric flow of the tempering fluid guided through the tempering module can be controlled depending on the respective temperatures.

The modules of a member/workpiece according to the invention may have been manufactured from various materials which take account of the respective demands. Thus, for example, the module which is designed as a one-piece element can be formed from a material of higher strength, a hardened and tempered steel, for example.

By contrast, the tempering modules could have been designed from materials having a heat conductivity but a reduced strength, and should the occasion arise, a hardness as well which are increased compared with the other material each. So, a tempering module can be formed from copper plates, for example.

By contrast, however, at least one plate-like element of a tempering module can also be designed from a material having a lower heat conductivity. One or a plurality of plate-like elements or also a complete tempering module, should the occasion arise, are thus allowed to form a thermal insulator and to protect particular areas of a member from undesired heating or cooling, for example.

Particularly in cases in which the various modules are formed from various materials, the different thermal expansion of the materials can be compensated in that designing and dimensioning the modules joined to each other is selected such that between these modules at least one cavity preferably in the shape of a gap is designed. One or a plurality of cavities as well should then communicate with the at least one channel and channel system, respectively, such that flowing through with tempering fluid is possible, and an insulating air gap in the respective areas can be avoided.

However, the employment of various materials for the modules can also be used for the sealing. Thus, for example, a tempering module of plate-like elements which are designed from a material having a higher thermal expansion than the material of the at least one further module each which is designed as a one-piece element can be used as a bundle. On the occasion, the plate-like elements of the tempering module could have been loosely laid on top of each other, and joined with each other only very slightly or locally limited with each other, respectively. Such bundles of plate-like elements can then be inserted into a respective housing of the module which is designed as a one-piece element. Then, such a housing is designed and dimensioned such that the outer shape and dimensioning of the respective tempering module is taken into account. The gaps having remained between the plate-like elements of the tempering module will then be closed during the operation by heating occurred, and accordingly the greater thermal expansion of the material which the plate-like elements are formed from, such that a sealing of gaps for the respective tempering fluid is attainable, and this exclusively flows through the channel/channel system.

It is not absolutely required but advantageous to join the single plate-like elements of a tempering module to each other. Also, the most different types of joint can be employed herein. Thus, it is readily possible to select a mechanical joint of the plate-like elements which in turn is releasable. These can be joined together by means of a screw joint or by clamping as well. This is quite often uncritical since fluid-tight sealing of plate-like elements joined together is not absolutely required for many individual cases of application since it is possible more or less to form a casing with the module(s) designed as a one-piece element.

However, the plate-like elements of such a tempering module can also readily be joined to each other in a material fit manner wherein this can be provided in turn by gluing, soldering or welding as well. A material fit joint of plate-like elements is also allowed to occur in an all-over manner i.e. gluing, soldering up or welding together takes place over the total area of plate-like elements which are in contiguous contact with the each adjacent plate-like element. A welding process which is appropriate for this, for example is diffusion welding.

Because of a relatively simple machinability of the individual plate-like elements forming a tempering module for designing adequate apertures which in turn form at least one channel or one channel system for the respective tempering fluid, the manufacturing cost decrease since short processing times can be achieved by correspondingly cost-effective cutting methods or by machining. At the same time, the shape and design of channels/channel systems are allowed to be very flexibly designed in the most various form taking into account the arrangement, dimensioning and designing of the respective apertures in the plate-like elements considering the respective thickness of plate-like elements. Thus, it is also possible to assemble and join plate-like elements having different thickness to a tempering module, respectively.

The inwardly facing surfaces of apertures formed in the plate-like elements can be finished by an eroding process or in another appropriate form. As a result, a smooth inner surface of channels/channel systems can be designed which is free of steps and projections. As a result, the tempering fluid is allowed to flow in an all-over manner along the surface of a channel/channel system such that insulating effects can be avoided on steps and projections in particular with small flow rates.

Since tempering modules contribute to the stability and strength of a member/tool according to the invention as well thus relatively small wall thicknesses between a surface of the member and a channel/channel system can be accomplished which for example could not be achieved with casting practice manufacturing of temperable members.

Modules designed as one-piece elements are allowed to have most differently contoured surfaces at least in areas wherein the respective contours can be established by most various forming methods.

Thus, such modules designed as a one-piece element may also be cast members. However, the respective contours can also be formed by most various machining techniques. Such modules can also be hardened or provided with a surface coating. Thus, for example, hard material layers can be applied which surely adhere and do not break and which achieve a plane surface having a high quality of finish. Preferably, merely the surfaces are allowed to be hardened, e.g. by means of a laser beam.

In particular, if a heavy strain will be mechanically put on members according to the invention a selective orientation of the plate-like elements of tempering modules can be selected in which the respective plate-like elements are aligned with the main direction of load. Thus, in this direction of the action of force it is allowed to make use of the correspondingly increased stress moment of the individual plate-like elements, and to avoid a spring action of gaps being present between such plate-like elements as well, if necessary.

However, tempering modules can also be used as retrofit elements with members/tools.

Tempering of the respective members/tools can be achieved by adequate dimensioning of tempering modules, and in this case in particular the respective channels/channel systems by means of adequate calculation using previously empirically detected local temperature readings. This can be achieved with the aid of images of a thermal image camera, for example.

DETAILED DESCRIPTION OF THE INVENTION

Figure 1:
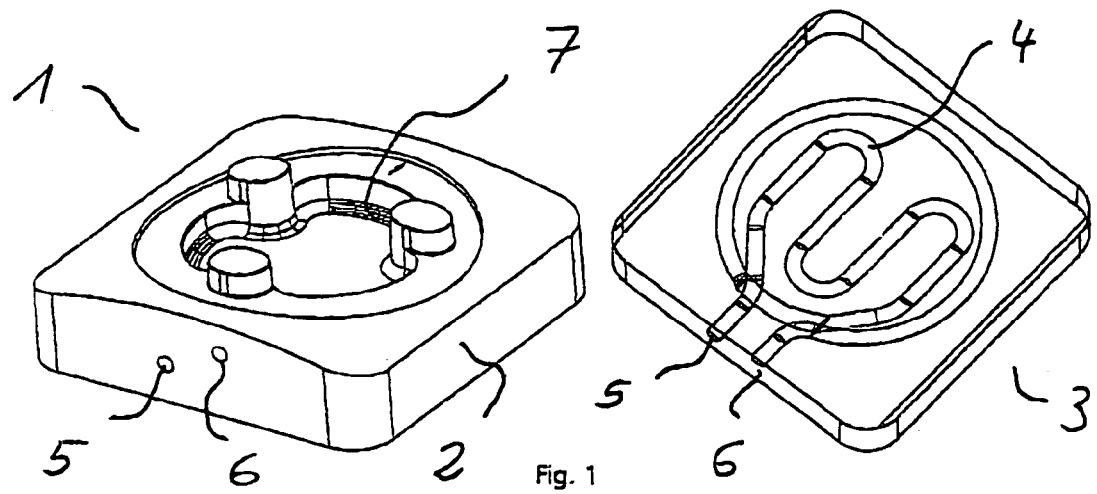
FIG. 1 shows in a perspective view a module which is designed as a one-piece element having a negative form of a workpiece to be manufactured, and a tempering module as well.

In FIG. 1 is shown a tool in a perspective view as an example for an embodiment of a temperable member 1. Then, the left hand representation illustrates an adequate tool on which a negative contour 7 for a workpiece to be manufactured is formed. The workpiece may be a forming tool, for example, but also a half of an injection mold or die casting tool.

In the right hand representation of FIG. 1 is shown in a diagrammatic and perspective view a tempering module 3 in which a channel 4 is formed. A tempering fluid such as cooled water is allowed to flow in through a channel 4 via an inlet 5, and is guided through an outlet 6 to a heat exchanger not shown and cooled therein, and is allowed to flow again into an inlet 5 through said channel 4.

Figure 2:
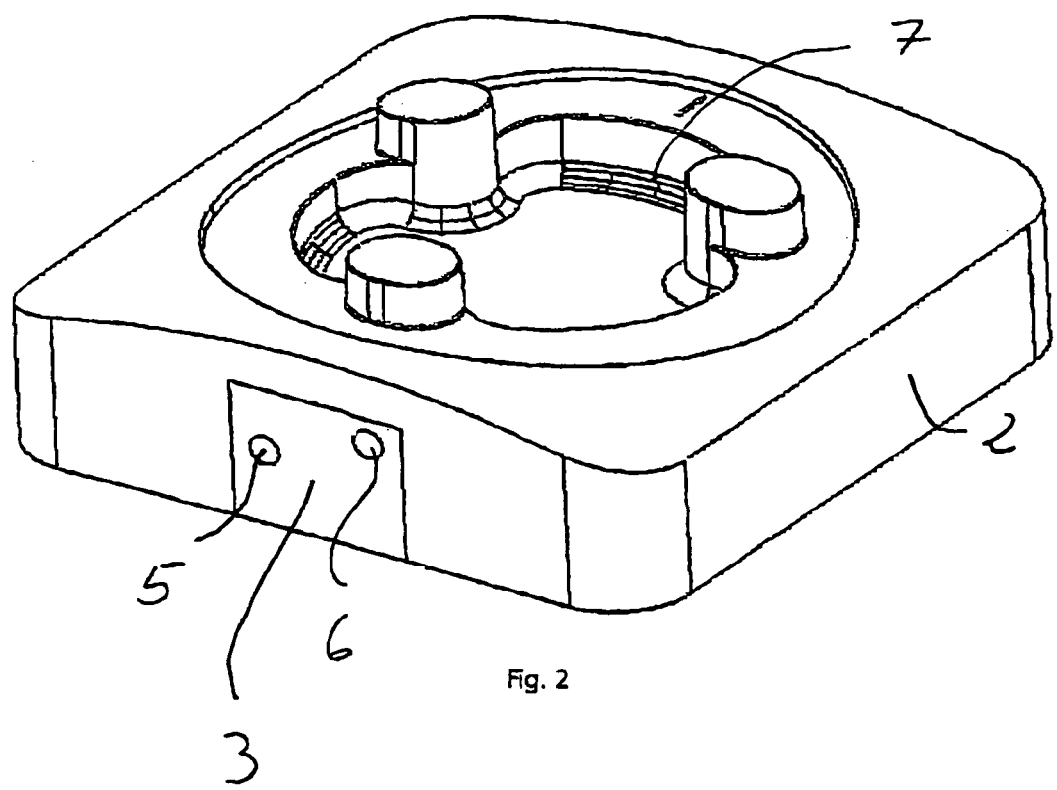
FIG. 2 shows a perspective view of a finish mounted tool according to FIG. 1.

With FIG. 2, it is illustrated how the modules 2 and 3 shown in FIG. 1 are mounted together wherein said connection can be provided by means of material fit or mechanical joint as already mentioned in the general part of the description. At least in the last mentioned case, then sealing elements not shown for ensuring fluid tightness should have been used.

Figure 3:
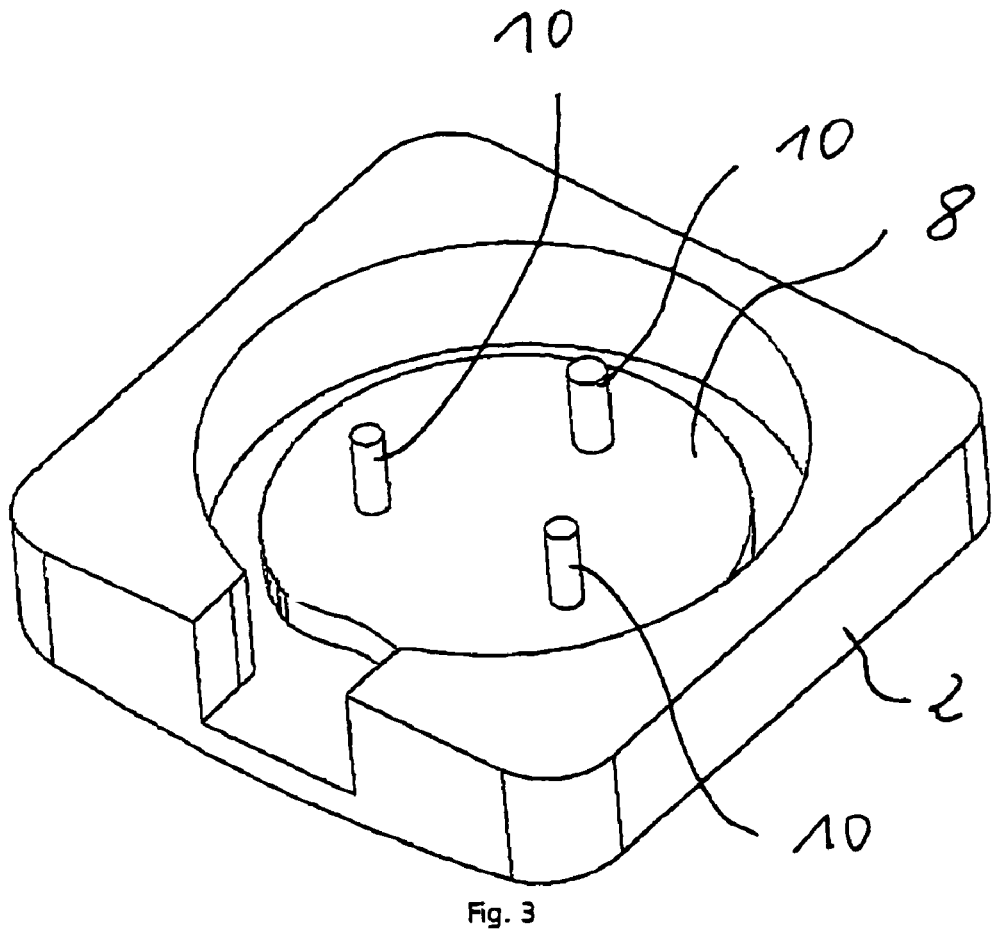
FIG. 3 shows a second module which is designed as a one-piece element and for receiving a tempering module.

In FIG. 3, in a perspective view, there is shown another module 2' which has been designed as a one-piece element as well.

Figure 4:
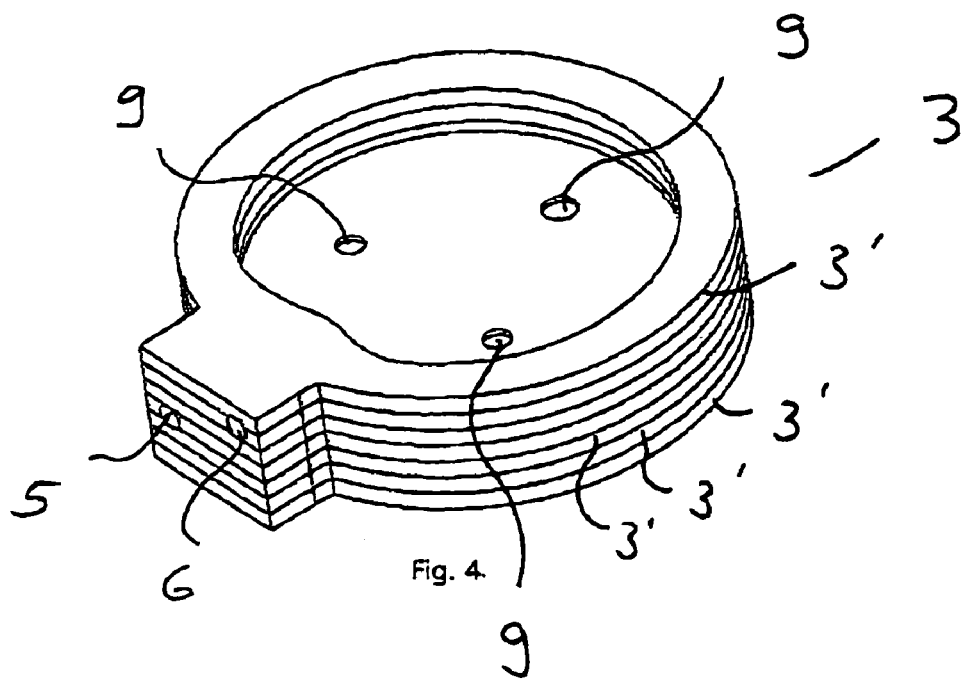
FIG. 4 shows a tempering module formed from plate-like elements arranged on top of one another.

Inside this second module 2' there is formed a housing 8 for a tempering module 3 such as shown in the FIG. 4. The tempering module 3 is formed from plate-like elements 3' arranged on top of each other. In the respective plate-like elements 3' three apertures 9 are designed in the shape of bores, in which three pins 10 can be introduced during the assembly of the module 2' with the tempering module 3 such that both fixing and correct aligning of the mounted tempering module 3 with respect to the module 2' is attainable. With the pins 10 acting pressure forces can also be compensated.

In FIG. 4, further apertures which are designed in the plate-like elements 3' and which form the channel 4 are discernible except from the inlet 5 and outlet 6.

With the apertures 9 and pins 10 a correct alignment of said modules 2, 2' and 3 to each other, and fixing the tempering module 3 on the module 2' can be achieved.

At least the module 2, in which said negative contour 7 is designed for a workpiece to be manufactured, could have been manufactured from a hardened and tempered steel, wherein the surface area of said negative contour 7 could still have been additionally hardened.

The tempering module 3 could have been formed from a material having a higher heat conductivity as already mentioned in the general part of the description, wherein the latter could also apply to the module 2' should the occasion arise.

Figure 5:
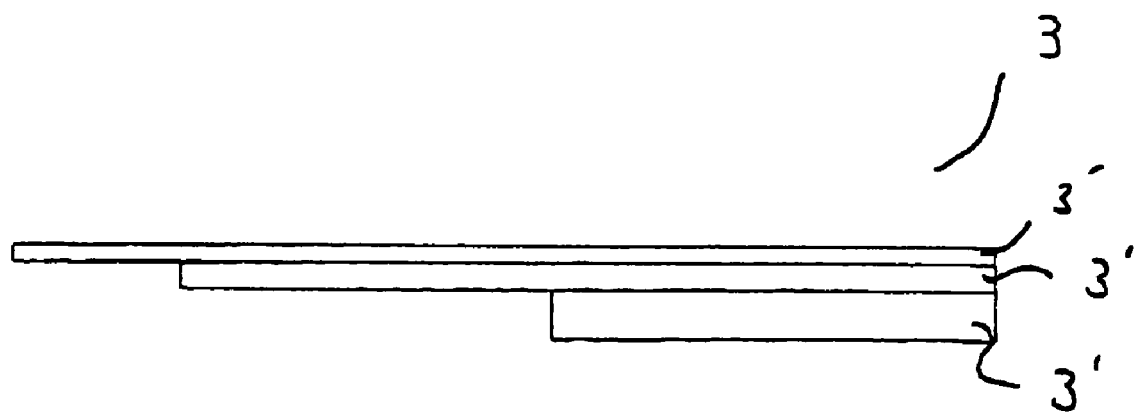
FIG. 5 shows a diagrammatic view of a portion of a tempering module having a stepped marginal contour.

With the diagrammatic view according to FIG. 5 ways for improvement of tempering modules 3 are to be demonstrated.

Thus, with the portion of a tempering module 3 shown in a sectional view, the possibility of forming a stepped marginal contour shall be illustrated. For this, individual plate-like elements 3' with their outer margin are correspondingly dimensioned in a different manner. Thus, in the stepped form, the encircling outer margins of said plate-like elements 3' are allowed to enclose differently large surfaces of said plate-like elements 3'. This can be carried out such that, as shown in FIG. 5, starting from the upper side of a tempering module 3 a more or less tapering in a correspondingly stepped shape of said tempering module 3 can be achieved, for example. A tempering module 3 designed this way is allowed then to be inserted into an adequately shaped and dimensioned housing of a module 2, 2' designed as a one-piece element wherein the housing formed inside the module 2, 2' has an adequately designed and dimensioned marginal contour such that between such a module 2, 2' and a tempering module 3 corresponding cavities between the stepped margins can be avoided. A housing inside the module 2, 2' could have been milled or eroded.

Differing from the illustration according to FIG. 5, a stepped marginal contour of the tempering module 3 can also be formed such that more large plate-like elements 3' are arranged above and external on the tempering modules 3, respectively, then followed by respective plate-like elements 3' having a smaller surface and being in a stepped shape again. Then, the plate-like elements 3' are allowed to have surfaces each reducing continuously. Alternatively, it is also possible to arrange smaller and larger plate-like elements 3' in alternating succession, however. In these cases it is advantageous for such a tempering module 3 to be cast into a module 2, 2' designed as a one-piece element.

With FIG. 5, it shall be further made clear that there is a possibility with the tempering modules 3 to insert plate-like elements 3' which each have a different thickness. On the occasion, it is not absolutely required, as shown in FIG. 5, to reduce or increase continuously the thickness of individual plate-like elements which are arranged on top of each other. Moreover, it is also possible for the thickness of individual plate-like elements 3' within a stack from which a tempering module 3 has been formed, to be selected such that the guideway of channels through which a tempering fluid for the tempering process is to flow can be taken into account. Thus, thicker plate-like elements 3' can be selected preferably in the areas of channels without radii of curvature of such channels, and thinner plate-like elements 3' in the areas in which such radii of curvatures of channels are available.

The invention claimed is:

1. A temperable member formed from at least a first module and a second module joined to each other, wherein said first module comprises a one-piece structure and said second module comprises a plurality of plate-shaped elements arranged on top of one another to form a stack, said plate-shaped elements formed from a different material having a higher thermal expansion than the material of said first module, said plate-shaped elements defining apertures that are alignable to form one or more channels within said second module through which a tempering fluid is flowable, wherein said plate-shaped elements define a stepped outer marginal contour and wherein said first module includes a housing which is complementary to said stepped outer marginal contour and in which said second module is insertable.

2. A member according to claim 1, wherein said first and second modules are joined together in a fluid-tight manner.

3. A member according to claim 1, wherein said second module includes at least one inlet and at least one outlet for said tempering fluid.

4. A member according to claim 1, wherein said first module includes at least one negative contour for tools to be manufactured.

5. A member according to claim 1, wherein said second module is formed from a material of higher heat conductivity than said first module.

6. A member according to claim 1, wherein at least one of said plate-shaped elements is formed from a material of low heat conductivity.

7. A member according to claim 1, wherein at least one cavity is provided between said joined first and second modules in fluid communication with said one or more channels.

8. A member according to claim 1, wherein said plate-shaped elements are joined together in a material fit manner.

9. A member according to claim 1, wherein said first and second modules are releasably joined together.

10. A member according to claim 1, wherein said second module is cast into said first module.

11. A member according to claim 1, wherein said plate-shaped elements have different thicknesses.

* * * * *